3,037,862
CRYSTALLINE POLYOLEFIN BASE FOR PHOTOSENSITIVE MATERIAL

Floyd T. Neth, New Orleans, La., assignor to Kalvar Corporation, New Orleans, La., a corporation of Louisiana
No Drawing. Filed July 22, 1958, Ser. No. 750,104
9 Claims. (Cl. 96—75)

This invention relates to films useful in photographic processes and more particularly to new and improved photographic films carrying a light sensitive layer or layers in which, after development by heat, a photographic image is formed by light scattering centers as opposed to the image formed by light absorbing material in silver halide photographic systems.

Elements suitable for use in light scattering photographic systems generally comprise a film base coated with a vehicle material, e.g. a water-free, hydrophobic vinyl resin, having a light sensitive agent such as a diazonium compound, dispersed therein. Since the permanence of the image in a successful light scattering photographic system depends to a large extent upon the internal structure of the vehicle material in which the light sensitive material is dispersed, it is important to use a film base which does not contain any solvent or plasticizer that can migrate into the light sensitive dispersion or emulsion. A further limitation is placed upon the choice of base material by the high temperature requirements of light scattering photographic systems which are, in general, developed by heating the film for a short period to a temperature of 200° F., or substantially above. In addition to these requirements, good optical quality, dimensional stability, and adhesive qualities insofar as the light sensitive layer is concerned, are also necessary.

Various types of bases have been used in the past for light scattering photographic materials. Polyester film, particularly polyethylene terephthalate film manufactured and sold under the tradename "Mylar" has been useful and desirable as the base for the light sensitive layer. While polyester film offers many desirable qualities as a photographic base, the cost of the film is high compared to many other photographic bases so that use of the resulting light scattering material is limited for many applications where, in all other respects, this material would be the most advantageous to use.

According to the present invention, it has been discovered that certain polyolefin films constitute highly desirable base materials for light scattering photographic elements. Thus, the photographic elements of the invention comprise a base coated with any conventional light sensitive layer in which, upon exposure and development, a photographic image is formed by light scattering centers, the base consisting essentially of a smooth, continuous transparent polyolefin film having certain characteristics, namely, good adhesion to the coated layer, freedom from plasticizers which migrate into the coated layer, a high degree of optical clarity, resistance to organic solvents and high dimensional stability and resistance to a wide range of temperatures and humidities.

The success of the invention depends upon the use of specific types of polyolefins having the characteristics outlined above. Thus, for example, conventional polyethylene, which includes a fairly high degree of branching and is prepared by polymerization of ethylene at pressures in excess of 500 atmospheres and temperatures of the order of 100° C. to 400° C., cannot be effectively used for the present purposes. On the other hand, linear polyethylene constitutes a highly desirable base for the purposes of the present invention.

One form of linear polyethylene suitable for use herein is sold under the tradename "Marlex." This polymer is prepared by polymerizing ethylene at atmospheric pressure and temperature using a "Ziegler type" catalyst. Linear polyethylene of the type described in U.S. Patent 2,816,883, prepared by polymerization at high pressures and temperatures, may also be used, in the present invention. The linear polyethylene contemplated for use herein when extruded, calendered or otherwise made into a thin film or sheet, is characterized by its high degree of crystallinity, usually 93 to 95% compared to a crystallinity of 63 to 65% for conventional polyethylene. The linear polyethylene also has a higher density of the order of 0.94 or above and substantially less side chains or branching than conventional polyethylene. These characteristics, and particularly the combination of higher crystallinity and the relative absence of vinyl branching, are apparently responsible for the ability of the polymer to withstand the requisite high temperature of development necessary for light scattering, heat developable layers. The linear polyethylene sheet also possesses excellent optical properties and the necessary high resistance to organic solvents. This material also has the great advantage, in comparison to present polyester films, of being relatively cheap. The manufacturer of light scattering materials is enabled thereby to compete in areas where heretofore the high cost of polyester sheet or film has made this impossible.

In order to obtain effective adhesion of the light scattering layer to the linear polyethylene, it is essential to pretreat the polyethylene film. It has been found that any of the known methods for improving the adhesion of printing inks to ordinary polyethylene can be used for the present pretreatment. Generally speaking, three methods are known for developing good adhesion of printing inks to ordinary polyethylene. These methods include treating the sheet material with flame as described in British Patent No. 783,664, bombarding the material with an electron beam, or chemically treating the same by passage through a chamber containing gaseous chlorine, the chlorination reaction being catalyzed by ultraviolet light. The first two of these methods apparently rely upon oxidation while the latter method comprises chlorination and each method is highly effective in improving the characteristics of the linear polyethylene to such an extent that adhesion thereto of the light sensitive layer or layers is excellent. When a light scattering photographic layer is conventionally coated on linear polyethylene treated in the above described manner, it has been found that the resultant film is an excellent photographic material possessing surprisingly good optical qualities, low inflammability, and high dimensional stability under a broad range of temperature and humidity changes.

Solid propylene polymer, e.g. polypropylene may be used as the base material according to the present invention, provided the polypropylene is pretreated as in the case of the polyethylene base. It has been found that the thus treated polypropylene polymer provides an excellent film base for light scattering photographic layers. The base is inexpensive, has a high heat stability, resists organic solvents, and contains no plasticizer which can migrate into the light scattering photographic layer applied thereto with adverse effects. A typical example of polypropylene suitable for use herein is the product "Profax."

As will be appreciated from the foregoing, the present invention utilizes a special group of pretreated solid polyolefin films which have been found to possess high optical clearness, uniformity of gauge, high stability to heat, high resistance to organic solvents, no plasticizers which may migrate into the light scattering photographic emulsions with adverse effects, and high dimensional stability under a wide range of temperatures and humidities. These polyolefins are also relatively inexpensive in comparison to polyester films or the like as a photographic film base for light scattering photographic layers.

Desirably, the light scattering photographic layer or layers coated onto the pretreated polyolefin bases described herein may correspond with those described in copending U.S. application Serial No. 623,050. Thus, the light scattering photographic layer may consist essentially of, for example, a water-free vinyl resin, desirably polyvinylidene chloride or a copolymer of vinylidene chloride and acrylonitrile (Saran), having a light sensitive diazonium compound uniformly dispersed therethrough. It will be appreciated, however, that other light scattering photographic emulsions or layers may be used with the bases described herein.

The invention is further illustrated, without being limited, by the following examples:

*Example I*

A film extruded from linear polyethylene ("Marlex") to an approximate thickness of 3 mils and pretreated by a flame treatment as in British Patent 783,664, was coated with a super knife to dry thickness of 0.5 mil with a light scattering photographic emulsion prepared according to Example I of copending U.S. application Serial No. 623,050. This film was then dried at an elevated temperature (e.g. 200° F. for about 30 minutes). The material was exposed and developed in a standard manner (e.g. 190° F. for about 7 seconds) and exhibited highly desirable photometric characteristics, good dimensional stability, good heat stability, image permanence, and base permanence.

*Example II*

The process of Example I was repeated using a polypropylene base ("Pro-fax"). A highly desirable material demonstrating optimum characteristics for a light scattering photographic system, was again obtained.

It will be appreciated that various modifications may be made in the invention described herein. Thus, the base according to the invention may be of different thickness, depending upon the use to which the finished product is to be put. The base materials are characterized by good strength, wearability and water resistance and the absence of inflammability. These highly desirable characteristics and others, including low cost, open up a wide new area of use for light scattering photographic systems. Because of the heat sealing characteristics of the polyolefin base, the present materials have the further advantage of being easy to splice. By the application thereto of heat, a strong bond may be obtained with marked resistance to bending and flexing.

Having described various embodiments of the invention, the scope thereof is set forth in the following claims wherein—

What is claimed is:

1. A photographic element capable of furnishing a record solely in the form of a distribution pattern of radiation scattering discontinuities formed within a vehicle which is substantially optically homogeneous comprising a base and a coating firmly bonded thereto, said base comprising a smooth, continuous transparent film of polyolefin selected from the group consisting of linear crystalline polyethylene having a density of at least about 0.94 and linear crystalline polypropylene and being free of diffusible plasticizers, said coating being dry, water resistant and non-hygroscopic and having a permeability constant for nitrogen within the range of $8.6 \times 10^{-16}$ and $8 \times 10^{-10}$, said constant being the number of cubic centimeters of nitrogen transmitted at 30° C. by an area of one square centimeter in one second when the pressure gradient is one centimeter of mercury per one centimeter of transmission thickness, the continuous phase of said coating comprising a synthetic, water-insoluble, non-hygroscopic, non-water swelling, highly linear thermoplastic polymer of a monomer containing a $>C=C<$ group, said coating having substantially uniformly dispersed therein as the sole essential image-producing agent a light decomposable solid agent which is non-reactive to said coating and which, upon exposure to light, decomposes into products which are chemically substantially non-reactive to said coating and which upon warming are volatile to form radiation scattering discontinuities only in the light struck areas in said film having the indicated permeability to thereby furnish said record.

2. A photographic element according to claim 1 wherein said base is linear polyethylene.

3. A photographic element according to claim 2 wherein the surface of said linear polyethylene is subjected to a flame pretreatment to improve the adhesion of said coating thereto.

4. A photographic element as set forth in claim 2 wherein the surface of said linear polyethylene is subjected to electron bombardment to improve the adhesion of said coating thereto.

5. A photographic element according to claim 1 wherein said base is polypropylene.

6. A photographic element according to claim 5 wherein said polypropylene is pretreated to improved the adhesion of said coating thereto.

7. A photographic element according to claim 1 wherein said coating consists essentially of a vinylidene chloride polymer having a light sensitive diazonium compound uniformly dispersed therein.

8. A photographic element according to claim 7 wherein said vinylidene chloride polymer is a copolymer of vinyl chloride and acrylonitrile.

9. A photographic element according to claim 1 wherein the surface of said base is subjected to a chlorination pretreatment.

References Cited in the file of this patent

UNITED STATES PATENTS

| | | |
|---|---|---|
| 2,703,756 | Herrick et al. | Mar. 8, 1955 |
| 2,773,769 | Goldschein | Dec. 11, 1956 |
| 2,816,883 | Larchar | Dec. 17, 1957 |
| 2,941,254 | Swerlick | June 21, 1960 |
| 2,980,964 | Dike | Apr. 25, 1961 |

FOREIGN PATENTS

| | | |
|---|---|---|
| 690,433 | Great Britain | Apr. 22, 1953 |